US008398732B2

(12) United States Patent
Turok et al.

(10) Patent No.: US 8,398,732 B2
(45) Date of Patent: Mar. 19, 2013

(54) PROCESS GAS FILTRATION

(75) Inventors: Robert Turok, Columbia, MD (US); Soren Sten Rasmussen, Soborg (DK)

(73) Assignee: GEA Process Engineering Inc., Columbia, MD (US)

( * ) Notice: Subject to any disclaimer, the term of this patent is extended or adjusted under 35 U.S.C. 154(b) by 442 days.

(21) Appl. No.: 12/595,448

(22) PCT Filed: Apr. 10, 2007

(86) PCT No.: PCT/DK2007/050042
§ 371 (c)(1),
(2), (4) Date: Oct. 9, 2009

(87) PCT Pub. No.: WO2008/122288
PCT Pub. Date: Oct. 16, 2008

(65) Prior Publication Data
US 2010/0116294 A1    May 13, 2010

(51) Int. Cl.
*B01D 45/00* (2006.01)
(52) U.S. Cl. ............. 55/342.2; 55/337; 55/447; 55/342; 55/345; 55/350.1
(58) Field of Classification Search .............. 55/337, 55/342.4, 342, 345, 350.1, 447; 134/19, 134/22, 18; 34/82, 553, 218, 576
See application file for complete search history.

(56) References Cited

U.S. PATENT DOCUMENTS

| | | | | |
|---|---|---|---|---|
| 464,904 A * | 12/1891 | Talley | | 33/752 |
| 2,531,343 A * | 11/1950 | Patterson | | 209/3 |
| 3,754,852 A * | 8/1973 | Rempel | | 425/429 |
| 3,771,289 A * | 11/1973 | Skoli et al. | | 96/228 |
| 3,835,216 A * | 9/1974 | Almagro et al. | | 423/332 |
| 4,649,037 A * | 3/1987 | Marsh et al. | | 423/338 |
| 4,948,362 A * | 8/1990 | Baird | | 432/14 |
| 5,762,797 A * | 6/1998 | Patrick et al. | | 210/497.1 |
| 5,776,259 A * | 7/1998 | Ciari | | 134/18 |
| 6,253,463 B1 * | 7/2001 | Hansen | | 34/362 |
| 6,560,897 B2 * | 5/2003 | Chickering et al. | | 34/577 |
| 2002/0015999 A1 | 2/2002 | Biddle et al. | | |
| 2003/0037459 A1 * | 2/2003 | Chickering et al. | | 34/576 |
| 2004/0040273 A1 * | 3/2004 | Lewin | | 55/447 |
| 2004/0118007 A1 * | 6/2004 | Chickering et al. | | 34/360 |
| 2004/0194338 A1 * | 10/2004 | Beyerinck et al. | | 34/576 |
| 2004/0216763 A1 * | 11/2004 | Gebhart et al. | | 134/2 |
| 2005/0050759 A1 * | 3/2005 | Chandran et al. | | 34/576 |
| 2006/0048674 A1 * | 3/2006 | Craig et al. | | 106/35 |

FOREIGN PATENT DOCUMENTS

WO      WO 2010006618 A1 *  1/2010

* cited by examiner

*Primary Examiner* — Jason M Greene
*Assistant Examiner* — Dung H Bui
(74) *Attorney, Agent, or Firm* — Sughrue Mion, PLLC

(57) ABSTRACT

The present invention relates to a spray drying system provided with a gas filtering system, which system is intended for use in the pharmaceutical industry for aseptic production of sterile pharmaceutical products or in other industries e.g. production of food, where an intake of sterile air for the drying process is necessary. The spray drying system for providing a particulate material comprises a spray drying chamber (3), after treatment equipment (4, 5) placed downstream of the spray drying chamber and a process gas heater (2) placed upstream in relation to the spray drying chamber (3), wherein an inlet filter (1) capable of removing microorganisms at a temperature below 140° C., is placed upstream of the process gas heater (2) and that the process gas heater (2) is a non-flaking heater.

13 Claims, 2 Drawing Sheets

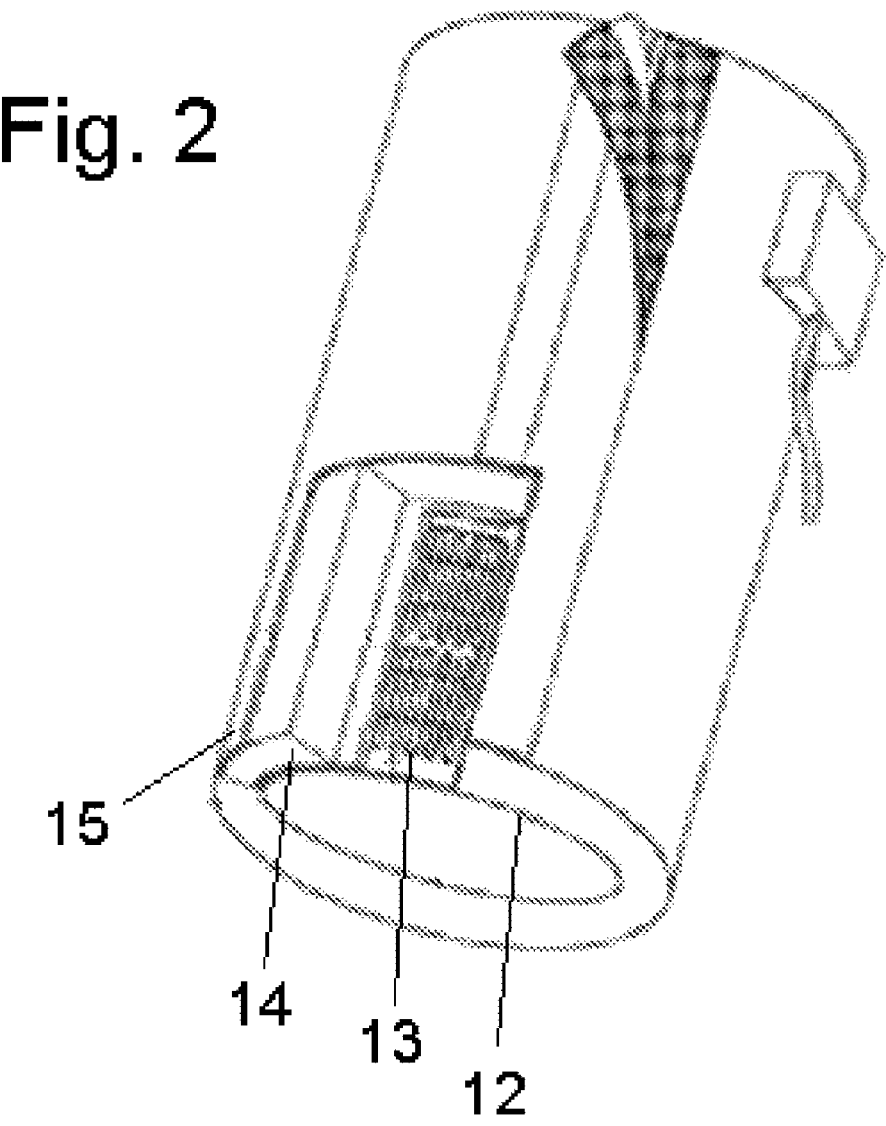

PROCESS GAS FILTRATION

The present invention relates to a spray drying system provided with a gas filtering system, which system is intended for use in the pharmaceutical industry for aseptic production of sterile pharmaceutical products or in other industries e.g. production of food, where an intake of sterile air for the drying process is necessary.

PRIOR ART

A spray drying system for a pharmaceutical process is normally of a size where the expected use of air would be around 25-5000 kg/hour. It is well known to provide such a spray drying system with a heat resistant filter placed between the spray drying chamber and the process gas heater; such a filter should be able to resist the hot process gas and excessive heating both through sterilization and subsequent processes. As these prior art spray drying systems use a filter located after the process gas heater the process is named "hot gas filtration".

The most commonly used heater for the process gas is an electric process gas heater, this heater has a complex geometry and is therefore difficult to clean but the electric heater is inexpensive and therefore a popular heating solution. A further problem is that an electric heater can release flakes of metal scale into the process gas because the heating element experiences high temperatures, when using an electric process gas heater, the filter positioned downstream in relation to the electric heater aims at acting as a cleaning barrier both filtering out any potential scale coming from the electric process gas heater and filtering out microorganisms and dust particles contained in the heated process gas.

Generally, filtering of hot gas is a challenge; an often used filter for hot process gases is a Termikfil 2000 from the company Camfil Farr, Inc. This filter is at present one of the most used filters for hot gas filtration on the market. The filter media in the Termikfil 2000 filter consist of a high-temperature, microfine ceramic based media; the filter has a maximum operating temperature of 350° C. and is certified to an efficiency of 99.99% on particles of 0.3 micron in size.

The following problems are related to the use of such a traditional filter for hot gases:

A) The traditional filter is a HEPA (high-efficiency particulate air) grade filter (traps minimum 99.97% of all particulates larger than 0.3 microns) and such a filter does not filter out all viruses and bacteria from the inlet gas. Further an upstream electric heater does not under normal process conditions have the residence time and the temperature to provide sterilization of the gas. If the filter is used at a temperature of 260° C. or higher this is not a problem because the high temperature in itself provides sterile conditions but unfortunately spray drying chambers within the pharmaceutical industry do not normally operate at 260° C. Spray drying of pharmaceutical products typically applies an inlet gas temperature between 100-180° C., and this temperature is not high enough to keep the system free of micro organisms after sterilization.

B) It is difficult to find a filter which is guaranteed non-shedding e.g. the Termikfil 2000 filter manufacturer will not guaranty the filter is non-shedding.

C) The Termikfil 2000 manufacturer does not claim that the filter materials are 21 CFR compliant, the filter is made of ceramic fibers that are held together by a binder.

D) Current available hot gas filter elements are not suitable for inline steam sterilization.

E) The filter cannot be re-used once it has been taken out of its housing without compromising filter integrity.

F) The filter is expensive (about $9000 for a single element).

G) The filter requires a burn-in process to insure that all the binder holding together the fibers in the filter element are stable and not vaporizing. This burn-in process must be performed in place in the aseptic spray drying chamber it services. Smoke is expelled from the filter during burn in requiring the spray drying chamber processor to be cleaned. The burn in and the cleaning of this filter are costly to the user because it takes away time where the process equipment could be making product.

H) HEPA filters (media and seals) cannot withstand the temperatures within the “hot filtration” used for depyrogenation. The binder burns off the media leaving a residue similar to the mantel of a gas lantern. The expansion and contraction of the metal frame destroys the seals between the filter frame and the structure as well as the media to the frame. Any oils (PAO or DOP) used to challenge filters in zones that will be heated will outgas. The hot oil vapor can deposit on colder surfaces (drying chamber) due to thermophoresis. The aerosol challenge required to test the filter integrity may become a product contaminant.

It is difficult to heat the whole system adequately during the required sterilization process due to heat losses from the outer surfaces of the spray drying system and due to different heat transfer conditions from the inner surface to the outer surface in the walls of the spray drying system. One way to solve this problem is to apply an excessive insulation to the equipment which equipment comprises both the spray drying chamber and any after treatment equipment being in contact with the product. Another way is to supplement the process gas heater with local heaters e.g. with electrical heat tracing applied in places with cold bridges in order to insure aseptic conditions. Using hot gas to heat all the inner surfaces of the system which are in contact with the media to e.g. at least 170° C. for 1 hour requires excessive gas inlet temperatures, possibly temperatures exceeding the manufacturer’s recommendation of the system gaskets. Exceeding a maximum temperature for a material specification in the system would not comply with CGMP standards.

Further the commonly used spray drying chamber sterilization systems have been difficult to validate by users because it is difficult to achieve the minimum sterilization temperature on ail inner surfaces without compromising the integrity of gaskets and filter elements.

SUMMARY OF THE INVENTION

According to the present invention the process gas is first filtered and then the process gas is heated in a heating device which does not release particles. In such a system the spray drying chamber can be supplied with sterile gas from a filtering system that filters all viruses and bacteria from the process gas before the gas passes the heater, this process is therefore named “cold gas filtration”. The process gas will, after having passed through the cold filter, be sterile.

The inlet process gas filter has the following characteristics as specified by its manufacturer.

A) 0.003 uM rating (NaCl CNC particle analysis)

B) PTFE double layer membranes

C) 100% bacteria, viruses and particles retentive in gases

D) USP Biological reactivity test in vivo for class VI-121 C plastics

E) Meet cleanliness per USP particulates in injectable

F) Non-fiber releasing

G) Non-Pyrogenic per USP Bacterial

H) Endotoxins (<0.25 EU/ml)

I) Manufactured with FDA-listed Materials per 21 CFR Pyrogenics, other bacteria and viruses are removed from the filter and the ductwork by washing with clean water e.g. with WFI water (Water For Injection—highly purified water) before the steam sterilization process. Afterwards the filter positioned upstream of the heater, the heater and the ductwork before the heater are sterilized with steam.

Two different processes needing heating are performed in the spray drying system: a production process and a sterilization process.

Sterilization in dry heat requires that all surfaces in the system being in contact with the product is heated e.g. to a minimum temperature of 170° C. and held for at least one hour.

The sterilization process would normally require that the process gas has to be heated to a temperature around 250° C. in order to maintain a minimum surface temperature in the process equipment of at least 170° C.

Instead of heating the process to such an excessive temperature the system according to the invention can be supplied with general surface heaters also called blanket heaters covering the drying chamber, outlet ductwork and the gas/particle separator system which might be in the form of a cyclone. A general surface heater can provide a continuous heating of the outer surfaces of the equipment which on the corresponding inner surface are in contact with the processed media. The blanket heaters are manufactured specifically for this use. The heaters can be made with a multi stranded element that has a serpentine pattern across the blanket. The blanket panel has embedded two RTD's. One RTD (Resistance Temperature Detector) is for heater control and the other is for temperature monitoring.

The heater element is sandwiched between sheets of high temperature materials, i.e. silicone. There are between 5 and 60 panels that will heat each piece of equipment depending on size. The surface heaters will normally be designed to heat the neighboring inner vessel surfaces to between 180-220° C. The surface heaters supplements the process gas heaters in order to reach the high temperatures required during sterilization and to reduce sterilization cycle time. The heating of the process gas is provided by the indirect heater e.g. a cleanable shell and tube heat exchanger using thermal fluid as a heating media or high pressure steam. The heat exchanger could also be a double tube sheet design commonly used in sanitary applications. By this process it can easily be insured that a sterilization temperatures between 180 and 210° C. can be reached, normally 180° C. is the minimum accepted by most users.

A non-flaking heater is a heater which does not release particles when heated; the releasing of particles is normally the result of a combination of the material used for the heating surfaces and high temperatures. If the surface temperature of the heating surfaces in the heater can be kept below around 400° C., there will normally not be problems with flaking.

The process gives a fast heat up of the equipment and it is also possible to add a cooling circuit to the indirect heater to enable fast equipment cool down thereby shortening the sterilization cycle times.

This heating combination also has the advantage that it will not be necessary to excessively insulate the drying chamber in order for the sterilization process to take place. This heating system therefore provides a faster sterilization cycle allowing the user to increase the production time and thereby increase the amount of product produced. Further the heating combination also provides a uniform heating of the inner surfaces thereby making it easier to validate the system. That the heating is uniform means that the resulting temperature of the inner surfaces only varies with around 20° C. throughout the system.

A system according to the present invention is a more robust sterilization technique and therefore easier to validate and shortens the time required to validate the heating cycles.

Using a spray drying chamber with maintenance access through the top makes it even more appropriate to use surface heaters e.g. in the form of blanket heaters to warm the surfaces of the spray drying system because inappropriately positioned flanges such as heavy flanges in the bottom chamber section are not needed for access and can therefore be eliminated. Therefore the lower section of the spray drying chamber comprises continuous walls without elements e.g. in the form of access flanges reducing the heat transfer at the bottom part of the spray drying chamber. There is usually no problem in heating the part of the spray drying chamber where the heated gas enters as the temperature around the entrance is relatively high, the entering position will normally be at the top part. Use of elements such as flanges in positions relatively far away from the entering of the heated gas e.g. at the bottom part of the spray chamber or the cyclone, will normally result in the formation of cold spots which require supplemental local heating in order to reach the defined sterilization temperature.

An appropriate filter for the process would be an ULPA filter (Ultra Low Penetration Air) filter. An ULPA filter is defined as a filter that has a minimum efficiency of 99.999% for particles in the most penetrating particle size at the specified media velocity. The most penetrating particle size is defined as that particle diameter for which penetration through the medium is a maximum.

An appropriate filter for the inlet process gas for cold filtration would fulfill the following specifications:
A) 0.003 uM rating (NaCl CNC particle analysis) particle retention
B) polytetrafluoroethylene (PTFE) double-layer membranes
C) 100% bacteria, viruses and particles retentive in gases
D) Meets USP Biological Reactivity, In Vivo, for Class VI-121° C. plastics
E) Meets cleanliness per USP Particulates in Injectables
F) Non-fiber releasing
G) Non-Pyrogenic per USP Bacterial Endotoxins (<0.25 EU/ml)
H) Manufactured with FDA-listed Materials per 21 CFR The filter should be subjectable to steam sterilization and therefore be able to resist 121° C. for at least 15 min.

DESCRIPTION OF FIGURES

FIG. 2 shows the body of a spray drying chamber provided with a surface heater.

Figure 1:
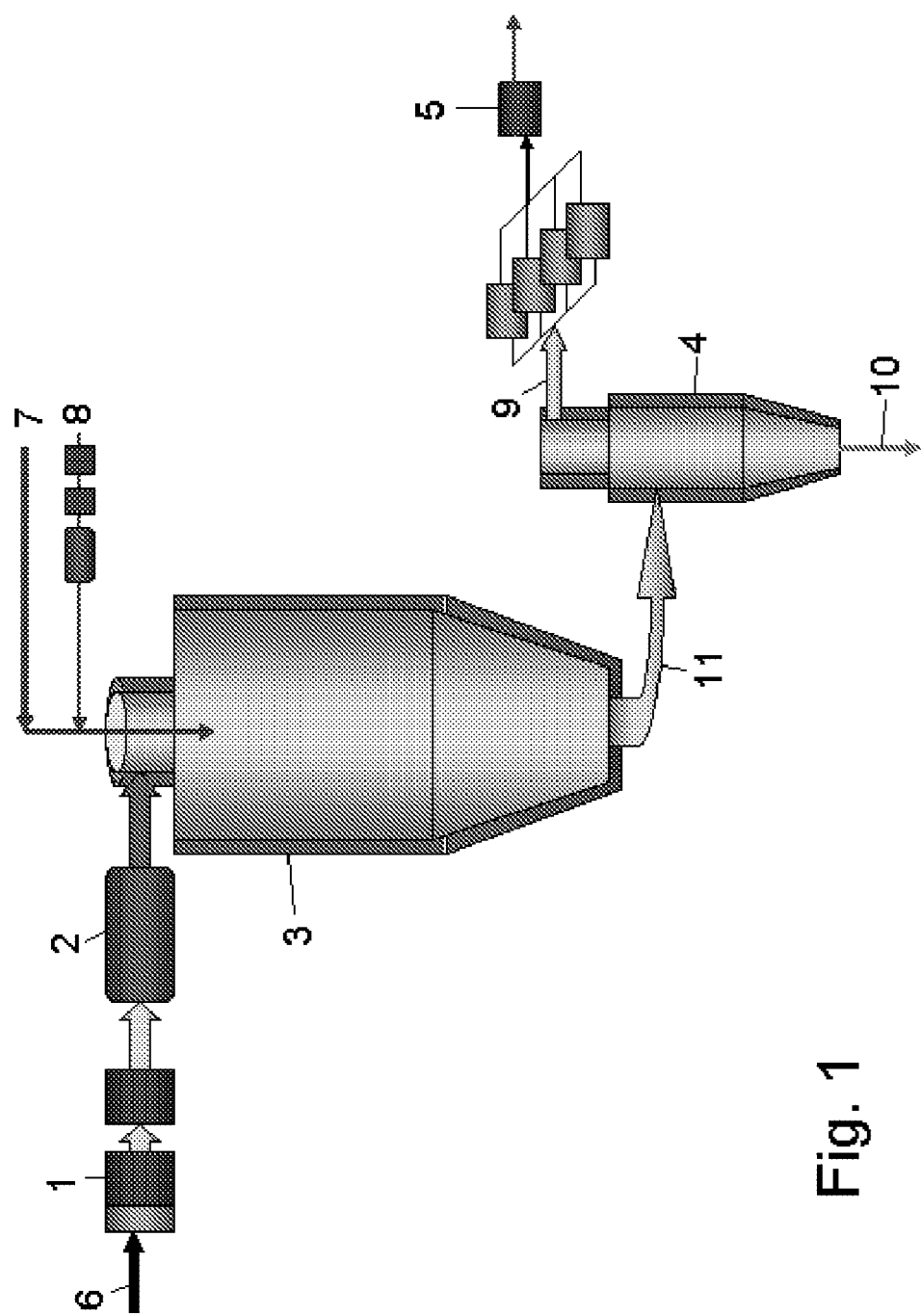
FIG. 1 shows an embodiment of a spray drying system according to the invention.

The system comprises an inlet filter 1 which might be consist of several filters, a gas heater 2, a spray drying chamber 3, a cyclone 4 for separating gas and particles, and an outlet filter 5 separating dust from the outlet gas. The outlet filter 5 can be combined with pre-filters 5a for catching larger particles and increase the lifetime of the outlet filter 5.

Normally ambient air is used as process gas as this is the least expensive solution for providing large amounts of process gas but nitrogen is also an often used process gas. During the production process the process gas enters the system through the inlet 6 and is routed through the filter 1 and then the process gas enters the heater 2 where the gas is heated to between 100 and 180° C., the actual temperature depends on which media is to be processed. The gas is sterile after having passed through the filter 1.

Then the gas enters the spray drying chamber 3 through an air distributor assuring a flow pattern suitable for drying of the media to be processed. The media enters the spray drying chamber through a feed line 7 and a pressurized gas e.g. nitrogen or air enters through a line 8 and is used as an atomization gas in one or more fluid nozzles provided at the top of the spray drying chamber 3. The pressurized gas is sterile and do normally constitute around 3% of amount of process gas. The not shown nozzles enable proper atomization of the liquid products into droplets. The sterile media is thus entering the spray drying chamber through the top section and is dried to a powder in the spray drying chamber. After having been dried, the gas/particle suspension is transferred to a cyclone 4 via a ductwork 11, and in the cyclone 4 the suspension is separated into respectively a particle fraction and a gas fraction. The gas fraction exits the cyclone through a conduct 9 and is filtered through the filter 5 which might comprise a series of filters in order to remove the remaining amount of particles before the drying gas is either exhausted or recycled.

Before starting up production the system must be cleaned and sterilized/depyrogenated. The initial system cleaning is done via a series of cleaning nozzles throughout the drying system wetting all product contact surfaces. Alternatively ductwork e.g. between the inlet filter and the spray drying chamber can be cleaned via flushing by running the cleaning solutions through this section. A typical cleaning cycle would start with a potable water flush and then with a series of chemicals and detergents finishing off with a potable water flush and a purified water rinse. Rinsing endpoints maybe determined by analytical measurement like conductivity.

Sterilization and depyrogenation takes place in three phases:
A) The section between the inlet filter system and the spray drying chamber is washed with caustic and/or purified water, then steam sterilized.
B) The balance of the dry gas system will be dry heat sterilized and depyrogenated by heating all surfaces to between 170 and 210° C. and holding until the depyrogenation is complete. This process may require between 4 and 8 hours. The system is heated via a combination of heated gas from the process heater and the supplemental blanket heaters covering the drying chamber outlet ductwork and the cyclone. During this process there maybe a by pass of gas through the lower section of the cyclone heating the cyclone lower section.
C) The feed line and atomization gas line. These lines will be washed with purified water and then steam sterilized. Some dry heat sterilization maybe take place downstream of the atomization gas heater.

After sterilization the system is cooled to operating temperature. The system cooling can be assisted with a cooler located in the thermal fluid circuit. During the cooling procedure the process gas heat exchanger can be turned into a cooler, cooling the system. When the system is cooled it will again be ready for processing.

FIG. 2 shows a cut-through view of an embodiment of the body of a spray drying chamber. From this angle it is possible to see the functional layers of the embodiment. On the outer surface of the inner sheet 12 of the spray drying chamber, the blanket heater 13 is positioned. The blanket heater will normally cover all of the surfaces in contact with process gas on the spray drying chamber 3, outlet duct 11 and cyclone 4. A layer of insulating material 14 is placed on the outer side of the blanket heater 13. In order to provide the spray drying chamber 3 with a cleanable outer surface, the insulating material is covered by a hard plain material e.g. a layer of fully welded stainless steel.

The invention claimed is:

1. Apparatus for providing a particulate material for use in the pharmaceutical or food industry, wherein the apparatus comprises a spray drying chamber, after treatment equipment placed downstream of the spray drying chamber, and a process gas heater placed upstream in relation to the spray drying chamber, and wherein a sterile inlet filter configured to remove microorganisms at a temperature below 140° C. is placed upstream of the process gas heater, and wherein the process gas heater is a non-flaking heater.

2. Apparatus according to claim 1, wherein the inlet filter can resist steam sterilization at a temperature of at least 121° C. for a duration of minimum 15 min.

3. Apparatus according to claim 1, wherein the inlet filter is of the dry type filter in a rigid frame having a minimum particle collection efficiency of 99.999% for particles 0.1 to 0.2 μm when tested in accordance with Methods of IEST-RP-CC-007.

4. Apparatus according to claim 1, wherein the after treatment equipment comprises a gas/particle separator.

5. Apparatus according to claim 4, wherein the gas/particle separator is one of a cyclone or a textile filter or a combination of a cyclone and a textile filter.

6. Apparatus according to claim 5, wherein the gas/particle separator is followed by a dust filter.

7. Apparatus according to claim 1 and comprising a surface heater.

8. Apparatus according to claim 7, wherein the surface heater comprises a blanket heater.

9. Apparatus according to claim 8, wherein the blanket heater consists of one or more individually controlled heaters which together cover at least 30% of the outer surfaces of the apparatus having inner surface contact with the process gas.

10. Apparatus according to claim 1, wherein the spray drying chamber has a top part and a maintenance opening in the top part.

11. Process for cleaning and sterilization of the apparatus according to claim 1, wherein the process comprises the following steps:
   a) the apparatus is washed e.g. with clean water (WFI water),
   b) the filter and heater are sterilized with steam,
   c) dry gas at a minimum temperature is passed through the apparatus for a minimum time determined by sterilization demands.

12. Process according to claim 11, wherein a supplemental surface heater is activated during step c).

13. Process according to claim 11, wherein the surface heater has the form of a blanket heater placed in contact with the outer surface of the product contact surfaces of the apparatus.

* * * * *